United States Patent [19]

Chang et al.

[11] 4,034,017

[45] July 5, 1977

[54] COMPOSITION USEFUL IN MAKING EXTENSIBLE FILMS

[75] Inventors: Wen-Hsuan Chang; J. Alden Erikson; Roger L. Scriven, all of Gibsonia, Pa.

[73] Assignee: PPG Industries, Inc., Pittsburgh, Pa.

[22] Filed: Apr. 10, 1975

[21] Appl. No.: 567,022

Related U.S. Application Data

[63] Continuation-in-part of Ser. No. 392,584, Aug. 29, 1973, abandoned.

[52] U.S. Cl. ................. 260/859 R; 260/77.5 CR
[51] Int. Cl.² ........................................ C08L 75/04
[58] Field of Search ... 260/859 R, 859 PV, 77.5 CR

[56] References Cited

UNITED STATES PATENTS

| | | | |
|---|---|---|---|
| 3,297,745 | 1/1967 | Fekete | 260/471 C |
| 3,368,988 | 2/1968 | Sekmakas | 260/21 |
| 3,457,324 | 7/1969 | Sekmakas | 260/834 |
| 3,624,020 | 11/1971 | Klebert | 260/859 R |
| 3,641,199 | 2/1972 | Niederhauser | 260/77.5 AM |
| 3,677,920 | 7/1972 | Kai | 260/859 R |
| 3,772,404 | 11/1973 | Knight | 260/859 R |
| 3,779,995 | 12/1973 | Dannels | 260/77.5 CR |
| 3,891,523 | 6/1975 | Hisamatsu | 260/859 R |
| 3,919,351 | 11/1975 | Chang | 260/850 |

*Primary Examiner*—Paul R. Michl
*Attorney, Agent, or Firm*—William J. Uhl

[57] ABSTRACT

Cured coatings having a high degree of extensibility, gloss retention, good sprayability and other desirable properties are obtained from compositions made by reacting (A) an organic polyisocyanate; (B) a hydroxy-containing material selected from the group consisting of saturated polymeric diols having low glass transition temperatures, saturated low molecular weight diols, and mixtures thereof; (C) a hydroxyalkyl ester of an ethylenically unsaturated carboxylic acid; (D) one or more copolymerizable monomers; and (E) a curing agent. These compositions, when used as coatings, are durable, adherent and highly flexible. The coatings are particularly useful on resilient and rubbery substrates such as EPDM rubber, foam rubber, polyurethane foam, and on metal surfaces, such as mild steel and aluminum.

13 Claims, No Drawings

4,034,017

COMPOSITION USEFUL IN MAKING EXTENSIBLE FILMS

CROSS-REFERENCE TO RELATED APPLICATIONS

This application is a continuation-in-part of application Ser. No. 392,584, filed Aug. 29, 1973, now abandoned.

Background of the Invention

Recent advances in coating technology have provided coatings which are suitable for use over various substrates which are difficult to coat and which have many different properties. Coatings of excellent appearance, a high order of durability and having the ability to withstand severe environmental conditions have been obtained. Among the more advanced coatings are those employed on vehicles, such as automobiles, where good appearance must be maintained over long periods despite exposure to weather and various forms of attack during use.

Recently, there has been interest in the use of rubbery, resilient materials for areas which are subject to mechanical shock, such as automobile bumpers and moldings, exposed corners and surfaces of industrial machines, kickplates and other areas of doors and entrances, and the like. The use of such materials aids in providing protection against permanent structural damage, but in order to attain the desired appearance, a decorative and protective coating must be applied to the surface and this coating can also be damaged during use. Conventional coatings, including those employed on rubber and similar extensible objects used heretofore do not have the required combination of properties. These necessary properties include:

1. Extensibility - This property is necessary in order that the advantages of the resilient substrate can be utilized without destruction of the integrity of the surface of the coating.

2. Tensile Strength - A high degree of tensile strength is also necessary in order to avoid rupture of the film during use.

3. Package Stability - In order to permit ease of application, the liquid coating composition should be stable for extended periods under ambient conditions without either gelaton or depolymerization of the resin contained therein.

4. Film Stability - Certain coatings which are extensible and which have a relatively high tensile strength lose these properties upon aging and particularly if the coating is exposed to sunlight, weathering, etc.

5. Impact Resistance - The coating should have adequate impact resistance at various temperatures as encountered in extreme weather variations, including temperatures as low as −20° F. and as high as 120° F.

6. Adhesion - The coating should have satisfactory adhesion to the various substrates with which it is to be employed, including extensible materials such as foams, rubber, and the like, and metals such as mild steel. In addition, the coatings should have satisfactory intercoat adhesion with succeeding coats or with various primers which may be employed.

7. Chemical and Humidity Resistance - This includes properties such as saponification resistance upon exposure to acids and alkalis, resistance to various solvents and resistance to atmospheres of high humidity and heat.

8. Resistance to Cracking Under Temperature-Humidity Cycling - This property is important where the coating might be exposed to rapid variations in temperature and humidity such as might be encountered by automobiles during travel or storage. This property is tested by successively exposing the coated object to conditions of high temperature and high humidity, alternated with exposure to low temperature and low humidity.

Still other properties which are important for commercial applicability include non-toxicity and low sensitivity to moisture.

Finally, the compositions must possess sprayability at reasonable solids contents (i.e., > 5 percent). Sprayability, as is well-recognized in the art, is a measure of the minimum amount of solvent necessary to atomize a polymer system sufficiently to produce a uniform coating film. The measure itself is usually expressed (and is expressed herein) as a percent solids. Thus, a sprayability of 5 percent solids would denote a system requiring 95 parts of solvent per 5 parts of solids to atomize. If the solvent concentration is below the minimum, the polymer will form a stringy, webbed spray pattern. The sprayability of a resin will generally be a close indication of the sprayability of the paint or coating formulation.

It is especially difficult to obtain the above properties in combination since, in most instances, the obtention of one or several of the properties desired requires the use of materials and formulations which under ordinary circumstances tend to make the other desired properties less satisfactory.

SUMMARY OF THE INVENTION

The coating compositions of the present invention are produced by reacting an organic polyisocyanate, a hydroxy-containing material selected from the group consisting of saturated polymeric diols of low glass transition temperatures, saturated low molecular weight diols, and mixtures thereof, a hydroxyalkyl ester of an ethylenically-unsaturated carboxylic acid, one or more copolymerizable ethylenically-unsaturated monomers, and a curing agent. The curing agent may be in the form of a resin selected from the group consisting of aminoplast resins, phenolic resins, and polyisocyanates. If a polyisocyanate is used, it is preferable to utilize either a blocked or a masked polyisocyanate. Alternatively, the curing agent may be in the form of a monomeric alkoxymethyl-containing acrylamide or an ethylenically unsaturated blocked or masked polyisocyanate which will comprise at least a portion of the monomer component noted above.

Such coatings can be applied to virtually any solid substrate and are especially useful on rubbery resilient substrates, such as polyurethane or polyurethane foam, natural or synthetic rubber foam, and various elastomeric materials. They are also useful on other substrates, such as mild steel or aluminum.

The coatings herein provide all the above-mentioned properties to a satisfactory degree and have a combination of these properties not heretofore considered possible.

DETAILED DESCRIPTION OF THE INVENTION

In one aspect, the invention provides a method of producing a solvent-soluble coating composition which comprises reacting 1. from about 1 to 30 percent by weight of a saturated aliphatic or aromatic polyisocyanate;

2. from about 4 to 50 percent by weight of a hydroxyl-containing material selected from the group consisting of saturated aliphatic or aromatic diols having glass transition temperatures of less than 50° C., saturated aliphatic or aromatic low molecular weight diols and mixtures thereof;

3. from about 2 to 20 percent by weight of a hydroxyalkyl ester of an ethylenically unsaturated carboxylic acid;

4. from about 1 to 20 percent by weight of a monomer selected from the group consisting of alkoxymethyl-containing ethylenically unsaturated amides, and ethylenically unsaturated blocked isocyanates and mixtures thereof which are capable of curing said coating composition through hydroxyl functionality of said reaction product and the isocyanate groups of said blocked isocyanates or the N-alkoxymethyl groups of said amide;

5. from about 25 to 90 percent by weight of an ethylenically unsaturated monomer or monomers different from (3) and (4); (1), (2) and (3) reacting with one another through condensation reaction at times and temperatures sufficient to preserve the blocked isocyanate groups and the N-alkoxymethyl groups in said amide; the equivalent ratio of isocyanate groups to hydroxyl groups in (1), (2) and (3) being between 1:1.1 and 1:9 so as to obtain an ungelled reaction product and introduce, hydroxyl functionality into the reaction product; (3), (4) and (5) reacting with one another through addition polymerization at times and temperatures sufficient to preserve the blocked isocyanate groups and the N-alkoxymethyl moieties in said amide, said coating composition being further characterized as being essentially free of unreacted NCO groups and ethylenic unsaturation and said coating composition being curable through reaction of the N-alkoxy-methyl groups or the blocked isocyanate groups at times and temperatures sufficient for these groups to react with hydroxyl functionality of said reaction product.

In another aspect, the invention provides a method of producing a coating composition which comprises:
a. reacting
1. from about 1 to 30 percent by weight of a saturated aliphatic or aromatic polyisocyanate;

2. from about 4 to 50 percent by weight of a hydroxyl-containing material selected from the group consisting of aliphatic or aromatic polymeric diols having glass transition temperatures of less than 50° C., saturated aliphatic or aromatic low molecular weight diols and mixtures thereof;

3. from about 2 to 20 percent by weight of a hydroxyalkyl ester of an ethylenically unsaturated carboxylic acid;

4. from about 25 to 90 percent by weight of at least one ethylenically unsaturated monomer different from (3); (1), (2) and (3) reacting with one another through a condensation reaction with the equivalent ratio of isocyanate to hydroxyl groups being between 1:1.1 and about 1:9 so as to obtain an ungelled reaction product and introduce hydroxyl functionality into said reaction product; (3) and (4) reacting with one another through addition polymerization; said ungelled reaction product being further characterized as being essentially free of unreacted NCO groups and ethylenic unsaturation; (B) curing the reaction product (A) with a curing agent which cures said reaction product through condensation reaction with hydroxyl functionality of said reaction product. Examples of suitable curing agents are aminoplast resins, phenolic resins, and polyisocyanates. The polyisocyanates can be blocked or masked, and are different than the reaction product (A).

The hydroxyalkyl ester of the instant invention is a hydroxyalkyl ester derived from an ethylenically unsaturated carboxylic acid.

The preferred hydroxyalkyl esters are those containing hydroxy groups derived from monoacrylates or methacrylates of a diol such as hydroxyalkyl acrylates and methacrylates. Examples include acrylic acid and methacrylic acid esters of ethylene glycol, and 1,2-propylene glycol, such as hydroxyethyl acrylate and methacrylate and hydroxypropyl methacrylate, as well as polyethylene glycol monoacrylate and polycaprolactone diol or polyol monoacrylate. Hydroxybutyl acrylate, hydroxyoctyl methacrylate, and the like, are further examples of the hydroxy-containing esters effective in the instant invention. Also useful are the hydroxy-containing esters of such unsaturated acids as maleic acid, fumaric acid, itaconic acid, and the like. The hydroxyalkyl ester generally has a molecular weight in the range of about 100 to about 1500 and preferably from about 100 to about 1000.

The monomer or monomers to be used can be any ethylenically unsaturated compound copolymerizable with the reaction mixture, the polymerization taking place through addition polymerization of the ethylenically unsaturated linkages. These include monoolefinic and diolefinic hydrocarbons, halogenated monoolefinic and diolefinic hydrocarbons, unsaturated esters of organic and inorganic acids, amides and esters of unsaturated acids, nitriles or unsaturated acids, and the like. Examples of such monomers include styrene; butandiene-1,3; methyl methacrylate; acrylamide; acrylonitrile; 2-chlorobutene; alphamethyl styrene; alpha-chloro-styrene; 2-chloro-1,3-butadiene, chloroethylene; vinyl butyrate; vinyl acetate; allyl chloride; dimethyl maleate; divinyl benzene; diallyl itaconate; triallyl cyanurate; maleic anhydride; blends thereof; and the like.

As noted above, part of the monomer used may be (1) an alkoxymethyl-containing ethylenically unsaturated amide, such as N-alkoxymethylacrylamides, N-alkoxymethylmethacrylamides, alkoxymethyl diacetoneacrylamides, N-(alkoxymethyl)-0-(acryloxyethyl) carbamates, N-methyl-N-alkoxymethylacrylamides, and the like; (2) ethylenically unsaturated blocked isocyanates such as the reaction product of isophorone diisocyanate, hydroxyethylacrylate, and butanol or ε-caprolactam; or (3) ethylenically unsaturated masked isocyanates such as N-(trimethylamino)-methacrylamide.

The polyisocyanate which is used in the instant invention is a saturated aliphatic or aromatic polyisocyanate, preferably a diisocyanate. Many such organic polyisocyanates are known in the art, including p-phenylene diisocyanate, biphenyl diisocyanate, toluene diisocyanate, 3,3'-dimethyl-4,4'-biphenylene diisocyanate, 1,4-tetramethylene diisocyanate, hexamethylene diisocyanate, 2,2,4-trimethylhexane-1,6-diisocyanate, methylene-bis(phenyl isocyanate), lysine methyl ester diisocyanate, isophorone diisocyanate and methyl cyclohexyl diisocyanate. There can also be employed isocyanate-terminated adducts of diols or monoalcohols, such as ethylene glycol, 1,4-butylene glycol, polyalkylene glycols, polycaprolactone diols and the like. These are formed by reacting more than one equivalent of the diisocyanate, such as those mentioned, with one equivalent of a diol or monoalcohol to form an isocyanate-terminated product. Alternatively, the diol or mono-alcohol can be added along with the diisocyanate.

While diisocyanates are preferred, higher polyisocyanates can be utilized as part of the organic polyisocyanate. Examples are 1,2,4-benzene triisocyanate and polymethylene polyphenyl isocyanate.

It is preferred to employ an aliphatic diisocyanate, since it has been found that these provide better color stability in the finishing coating. Examples include bis-(isocyanatocyclohexyl)methane, 1,4-butylene diisocyanate, and methylcyclohexylene diisocyanate.

The polymeric diols to be used in the instant invention are saturated aliphatic or aromatic diols having glass transition temperatures of below about 50° C. The method of measuring the glass transition temperature of a polymeric polyol will depend upon the molecular weight and other physical properties. If the molecular weight is high, the Tg is usually measured with a penatrometer (Instruction Manual, "DuPont 900 Differential Thermal Analyzer - Accessories", 1968, Section 11-8). For low molecular weight crystalline polyols, the well-known relationship, $T_g/T_m = 3/2$ ($T_m$ = melting point), can be used. For non-cyrstalline polyols, if the Tg is below about 50° C., the polyol will flow below about 50° C. Many Tg values for various polyols are available in the literature. Also helpful in determining the Tg is the well-known Clash-Berg method, described in ADVANCES IN POLYURETHANE TECHNOLOGY, Burst et al, Wiley & Sons, 1968, pages 84 ff.

Among the preferred polymeric diols are polyether polyols. Especially preferred are poly(oxyalkylene)-glycols, such as poly(oxyethylene glycol), poly(oxypropylene glycol), and other such glycols having up to about 6 carbon atoms separating each pair of oxygen atoms. A specific preferred polyol is poly(oxytetramethylene) glycol.

Other highly desirable polymeric diols are polyester diols having the desired transition temperature, especially those produced from acyclic reactants such as adipic acid and azelaic acid and alkylene glycols, poly(-neopentyl adipate) is a useful example. It is desirable in some cases to include small amounts of cyclic compounds in the formation of the polyester polyols of this invention, and for this purpose, up to about 20 percent by weight of cyclic acids and/or alcohols may be used provided that the Tg of the diols is kept below about 50° C.

Still other polymeric diols of suitable properties include condensates of lactones and diols such as those produced from caprolactone and ethylene glycol, propylene glycol, and the like. In general, the diols used should have molecular weights between about 200 and about 5000 and preferably between about 250 and about 1500.

Polyurethane diols such as, for example, those prepared by reacting any of the above diols with a minor amount of polyisocyanate (OH/NCO ratio greater than 1:1) so that free hydroyl groups are present in the product may also be used herein.

The saturated aliphatic or aromatic low molecular weight diols useful in this invention are well known in the art and include such materials as cyclohexane dimethanol, 1,6-hexanediol, dimethylol propionic acid, neopentyl glycol, diethylene glycol, cyclohexanedimethylol, 2,2-dimethyl-3-hydroxypropyl-2,2-dimethyl-3-hydroxypropionate (Ester Diol 204), ethylene glycol, ester-containing diols, and the like. These materials generally have molecular weights of less than about 200.

If the composition as described does not contain a curing agent internally (e.g., an alkoxymethyl-containing ethylenically unsaturated acrylamide monomer), a curing agent selected from the group consisting of aminoplast resins, phenolic resins, and polyisocyanates will be added in order to cure the material to form a coating composition which can be sprayed and has acceptable gloss retention. When using polyisocyanates, it is preferable to utilize either a blocked or a masked polyisocyanate, although unique two-pack systems can be produced using an unblocked or unmasked polyisocyanate. If sufficient internal curing agent is present, the above curing agent is not necessary, although satisfactory results are attained if both types of curing agents are used.

An aminoplast is an amine-aldehyde condensate. The aminoplast resins used may be alkylated methylol melamine resins, alkylated methylol urea, and similar compounds. Products obtained from the reaction of alcohols and formaldehyde with melamine, urea or benzoguanamine are most common and are preferred herein. However, condensation products of other amines and amides can also be employed, for example, aldehyde condensates of triazines, diazines, triazoles, guanidines, guanamines and alkyl- and aryl-substituted derivatives of such compounds, including alkyl- and aryl- substituted ureas and alkyl- and aryl-substituted melamines. Some examples of such compounds are N,N'-dimethyl urea, benzourea, dicyandimide, formoguanamine, acetoguanamine, ammeline, 2-chloro-4,6-diamino-1,3,5-triazine, 6-methyl-2,4-diamino-1,3,5-triazine, 3,5-diamino triazole triaminopyrimidine, 2-mercapto-4,6-diaminopyrimidine, 2,4,6-triethyl triamino-1,3,5-trizine, and the like.

While the aldehyde employed is most often formaldehyde, other similar condensation products can be made from other aldehydes or mixtures thereof, such as acetaldehyde, crotonaldehyde, acrolein, benzaldehyde, furfural, glyoxal and the like.

The aminoplast resins contain methylol or similar alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohols such as cyclohexanol, monoethers of glycols such as Cellosolves and Carbitols, and halogen-substituted or other substituted alcohols, such as 3-chloropropanol and butoxyethanol. The preferred aminoplast resins are substantially etherified with methanol or butanol.

The phenolic resins which may be used as curing agents herein are formed by the condensation of an aldehyde and a phenol. The most used aldehyde is formaldehyde, although other aldehydes, such as acetaldehyde, can also be employed. Methylene-releasing and aldehyde-releasing agents, such as paraformaldehyde and hexamethylene-tetramine, can be utilized as the aldehyde agent if desired. Various phenols can be used; for instance, the phenol employed can be phenol per se, a cresol, or a substituted phenol is which a hydrocarbon radical having either a straight chain, a branched chain or a cyclic structure is substituted for a hydrogen in the aromatic ring. Mixtures of phenols are also often employed. Some specific examples of phenols utilized to produce these resins include p-phenylphenol, p-tert-butylphenol, p-tert-amylphenol, cyclopentylphenol and unsaturated hydrocarbon-substituted phenols, such as the monobutenyl phenols containing a butenyl group in the ortho, meta, or para position, and wherein the double bond occurs in various positions in the hydrocarbon chain. A common phenolic resin is phenolformaldehyde.

The polyisocyanate curing agent can be any of the polyisocyanates mentioned above. The organic polyisocyanate, as described above, can be blocked with a volatile alcohol, (-caprolactam ketoximes, or the like, so that they will be unblocked at temperatures above 100° C. may also be used. These curing agents are well known in the art.

A masked polyisocyanate may also be used as the curing agent. These masked polyisocyanates, as is known in the art, are not derived from isocyanates but do produce isocyanate groups upon heating at elevated temperatures. Examples of useful masked polyisocyanates include diaminimides

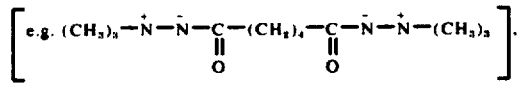

adiponitrile dicarbonate, and the like.

The reaction product of the invention may be obtained by any of a number of processes. For example, the hydroxyalkyl ester can be prereacted with the polyisocyanate. Subsequently, the product thus formed can be reacted either consecutively or simultaneously with the hydroxy-containing material and the monomer component. Similarly, the hydroxyalkyl ester, the hydroxyl-containing material and the polyisocyanate can be reacted, and subsequently the product can be reacted with the monomer component, or all four components may be reacted together simultaneously. Alternatively, the polyisocyanate and the hydroxy-containing material can be prereacted to form an isocyanate-terminated prepolymer, with the prepolymer reacted consecutively or simultaneously with the hydroxyalkyl ester and the monomer component. The addition of an external curing agent can similarly occur at any time. If an internal agent is used, as described above, it will form at least a part of the monomer component and will be processed in the same manner as the monomer. The sequence of reactive steps is generally selected so that gelation will be avoided. Further, all the reactions may be conducted at room temperature or higher, and in the presence or absence of catalysts such as tin catalysts and tertiary amines. Also, when the N-alkoxymethyl-containing ethylenically unsaturated amide or ethylenically unsaturated blocked isocyanate forms part of the monomer component, reaction should be conducted under conditions sufficient to preserve N-alkoxymethyl groups and blocked isocyanate groups.

In order to produce a solvent-soluble product, it is important that the equivalent ratio of isocyanate groups to hydroxyl groups at various reaction stages be carefully controlled. For example, when the isocyanate and the hydroxyl-containing materials are prereacted to form isocyanate-terminated products, the proportions of each may be widely varied; however, in order to prevent gelation in subsequent reactions, and in order to insure the production of an isocyanate-terminated prepolymer, the equivalent ratio of isocyanate to hydroxyl should be between about 1.1:1 and 3:1. Some monofunctional amine or alcohol may be added to reduce the functionality of the prepolymer. Similarly, when the hydroxy-containing ester and the polyisocyanate are prereacted, the equivalent ratio of isocyanate to hydroxyl should be between about 1.5:1 and about 10:1. Finally, regardless of the method chosen, the equivalent ratio of isocyanate to hydroxyl in the final reaction mixture should be between 1:1.1 and 1:9. Again monofunctional amines or alcohols, as well as hydroxy amines, may be added to prevent gelation. It is noted that water (e.g., in the form of moisture in the air) will contribute hydroxy groups to the reaction mixture. In fact, in some instances, it may be desirable to add small amounts of water to the reaction mixture.

The amount of each component in the composition may be varied over a wide range. Preferably, however, the composition comprises from about 1 to about 30, preferably 4 to about 25, percent by weight of polyisocyanate, from about 4 to about 50, preferably 8 to about 40, percent by weight of the hydroxy-containing material, from about 2 to about 20, preferably 4 to about 18, percent by weight of the hydroxyalkyl ester, and from about 25 to about 90, preferably 30 to about 80, percent by weight of copolymerizable monomer or monomers, from 0 to about 50 percent by weight of external curing agent, and from 0 to about 20 percent by weight of an internal curing agent selected from the group consisting of alkoxymethyl-containing acrylamides, ethylenically unsaturated blocked or masked isocyanates. The total amount of curing agent should be at least 1 and preferably should be at least 3 percent by weight.

In addition to the components above, the compositions ordinarily contain other optional ingredients, including any of the various pigments ordinarily utilized in coatings of this general class. In addition, various fillers, plasticizers, antioxidants, flow control agents, surfactants, and other such formulating additives can be employed in many instances. The composition is ordinarily contained in a solvent, which can be any solvent or solvent mixture in which the materials employed are compatible and soluble to the desired extent.

The compositions herein can be applied by any conventional method, including brushing, dipping, flow coating, and the like, but they are most often applied by spraying. Usual spray techniques and equipment are utilized. They can be applied over virtually any substrate, including wood, metals, glass, cloth, plastics, foams, and the like, as well as over various primers.

The coatings, both one-pack and two-pack systems, are cured at room temperature or elevated temperatures. In most cases, the cure schedule is from about 1 minute to several days at 24° C. to 204° C. Higher or lower temperatures with correspondingly shorter and longer times can be utilized, although the exact cure schedule best employed depends in part upon the nature of the substrate as well as the particular components of the compositions. Acid catalysts and other curing catalysts, such as dibutyltin dilaurate, can be added to aid in curing if desired; these can permit the use of lower temperatures and/or shorter times. If sufficient amount of catalyst is added, curing at room temperatures is often possible.

The compositions prepared by the method of the invention can also be made water-dispersible by techniques well known in the art. Thus, the reaction product can be made with acid groups, such as would be obtained by using a polyester diol, with unreacted acid groups, and/or dimethylol propionic acid as the hydroxyl-containing material. The acid groups would then be neutralized with organic or inorganic base to form salt groups and the resultant product dispersed in water. It is intended that the present claims encompass water-dispersible systems.

The invention will be further described in connection with several examples which follow. These examples are given as illustrative of the invention and are not to be construed as limiting it to their details. All parts and percentages in the examples and throughout the specification are by weight unless otherwise indicated.

EXAMPLE I

The following were charged to a reactor:

|  | Parts by Weight |
|---|---|
| ε caprolactone | 6780 |
| Hydroquinone (polymerization inhibitor) | 46 |
| tinuvin P (light stabilizer) | 8 |

The mixture was heated to 120° C., after which were added 2320 parts of hydroxyethyl acrylate, 10.5 parts of dibutyltin dilaurate, and 4 parts of stannous octoate, dropping the temperature to about 96° C. The resultant mixture was held at 120° C. for about 6 hours and was then cooled.

Using the above produced polycaprolactone acrylate, the following were charged to a reactor:

|  | Parts by Weight |
|---|---|
| Polycaprolactone acrylate | 230 |
| Bis(isocyanatocyclohexyl)methane | 133 |
| Polycaprolactone diol (reaction product of caprolactone and a glycol; molecular weight ≈ 500) | 250 |

The mixture was held at 75° C. for about 4½ hours, after which 2 drops of dibutyltin dilaurate were added. The mixture was held at 75° C. for about 2 hours and cooled.

The polyurethane acrylate formed above was blended as follows and the mixture was heated to 125° C.

|  | Parts by Weight |
|---|---|
| Polyurethane acrylate | 95 |
| Methyl butyl ketone | 80 |
| VM&P naphtha (an aliphatic hydrocarbon with a boiling range of from 118° C. to 145° C.) | 80 |

To this mixture was added over 1 hour, a blend of the following:

|  | Parts by Weight |
|---|---|
| 2-Ethylhexylacrylate | 46.0 |
| Methylmethacrylate | 41.5 |
| Methacrylic acid | 6.3 |

| | Parts by Weight |
|---|---|
| Styrene | 69.0 |
| Hydroxyethylacrylate | 13.0 |
| Butylmethacrylate | 46.0 |
| Methyl butyl ketone | 120.0 |
| Azobis(isobutyronitrile) | 3.0 |

The resultant blend was heated at about 125° C. for 3 hours, after which were added 30 parts of methyl butyl ketone, 1 part of azobis(isobutyronitrile), and 30 parts of VM&P naphtha. After about 2 hours at 120° C., 1.2 parts of bis-peroxyisopropylcarbonate were added. The mixture was held at 120° C. for about 4 hours and was then cooled. The resultant modified acrylic resin had an acid value of 3.8, a hydroxyl value of 17.0, a percent total solids of 27.6 and a Gardner-Holdt viscosity of $Z_1$-$Z_2$.

A coating formulation was then prepared by blending the following:

|  | Parts by Weight |
|---|---|
| Modified acrylic resin | 20.0 |
| Methylated melamine formaldehyde resin (Rohm & Haas MM83) | 2.4 |
| p-Toluene sulfonic acid | 0.016 |

The resultant mixture was drawn down (4.5 mils wet) over a steel substrate and was baked at 250° F. for 30 minutes. The resultant film had a Sward Hardness of 38 and a Gardner-Impact of greater than 160 inch pounds.

In a similar manner, a second coating formulation was prepared by blending the following:

|  | Parts by Weight |
|---|---|
| Modified acrylic resin | 33.0 |
| N,N',N''-[tris(isocyanatohexyl)]biuret (Desmodour N-75, Mobay Chemical Co.) | 2.7 |
| Dibutyltin dilaurate | 2 drops |

The resultant mixture was drawn down (3 mil wet) over a steel substrate and baked at 150° F. for 30 minutes. The resultant film had a Sward hardness of 14 and a Gardner Impact of greater than 160 inch pounds.

EXAMPLE II

The following were charged to a reactor to produce a polyurethane acrylate:

|  | Parts by Weight |
|---|---|
| Hydroxyethylacrylate | 116 |
| Bis(isocyanatocyclohexyl)methane | 266 |
| 1,6-hexanediol | 122 |
| Dibutyltin dilaurate | 1 drop |
| p-Methoxyphenol | 1.5 |
| Methyl butyl ketone | 100 |

The mixture was held at 75° C. for about 4 hours, after which 2 drops of dibutyltin dilaurate were added. The mixture was held at 75° C. for another 2 hours, followed by cooling and addition of 50 parts of methyl butyl ketone to reduce the viscosity.

The polyurethane acrylate formed above (52 parts) was mixed with methyl butyl ketone (160 parts) and heated to 125° C. To the mixture was added over a period of 1 hour a monomer system as set forth below:

| | Parts by Weight |
|---|---|
| 2-Ethylhexyl acrylate | 46.0 |
| Methyl methacrylate | 41.5 |
| Methacrylic acid | 6.3 |
| Styrene | 69.3 |
| Hydroxyethylacrylate | 13.0 |
| Butylmethacrylate | 46.0 |
| Methyl butyl ketone | 120.0 |
| Azobis(isobutyronitrile) | 3.0 |

The resultant blend was heated at about 125° C. for about 3½ hours after which were added 60 parts of methyl butyl ketone and 1.0 part of azobis(isobutyronitrile). After about 2 hours at 125° C., 1.2 parts of bis-peroxyisopropylcarbonate were added. The mixture was held at 120° C. for about 4 hours and was then cooled. The resultant modified acrylic resin had an acid value of 5.2, a hydroxyl value of 18.0, a percent total solids of 26.5, and a Gardner-Holdt viscosity of E-F.

A coating formulation was then prepared by blending the following:

| | Parts by Weight |
|---|---|
| Modified acrylic resin | 20.0 |
| Methylated melamine formaldehyde resin (Rohm & Haas MM83) | 2.6 |
| p-Toluene sulfonic acid | 0.016 |

The resultant mixture was drawn down (4.5 mils wet) over a steel substrate and baked at 250° F. for 30 minutes. The resultant film had a Sward Hardness of 54 and a Gardner Impact of 30 inch pounds.

In a similar manner, a second coating formulation was prepared by blending the following:

| | Parts by Weight |
|---|---|
| Modified acrylic resin | 31.0 |
| Desmodour N-75 | 2.7 |
| Dibutyltin dilaurate | 2 drops |

The resultant mixture was drawn down (3 mils wet) over a steel substrate and baked at 150° F. for 30 minutes. The resultant film had a Sward Hardness of 24 and a Gardner Impact of 40 inch pounds.

EXAMPLE III

The following were charged to a reactor:

| | Parts by Weight |
|---|---|
| Methylene bis(cyclohexylisocyanate) | 198 |
| Poly(oxytetramethylene)glycol (molecular weight = 1000) | 500 |

This mixture was heated at 150° F. for 4½ hours and was then cooled.

Using the above-prepared isocyanate-terminated prepolymer, the following were charged to a reactor:

| | Parts by Weight |
|---|---|
| Prepolymer | 69.8 |
| Hydroxyethylacrylate | 11.6 |
| Methyl isobutyl ketone | 50.0 |

The mixture was heated at 75° F. for 3 days.

The polyurethane acrylate formed above was then blended with a monomer system, and copolymerized as hereinafter set forth.

Four solutons were prepared as follows:

| Solution No. 1 | Parts by Weight |
|---|---|
| Polyurethane acrylate | 83.0 |
| N-butoxymethylacrylamide | 354.0 |
| Styrene | 1408.0 |
| Methacrylic acid | 40.0 |
| Maleic anhydride | 4.3 |
| Azobisisobutyronitrile | 17.6 |
| T-dodecylmercaptan | 54.0 |
| Butanol | 191.0 |
| Xylene | 63.0 |
| Solution No. 2 | |
| Butanol | 28.0 |
| Xylene | 106.4 |
| Solvesso 150 (aromatic hydrocarbon) | 332.0 |
| Solution No. 1 | 700.0 |
| Solution No. 3 | |
| Xylene | 259.0 |
| Solvesso 150 | 536.0 |
| Azobisisobutyronitrile | 13.1 |
| Solution No. 4 | |
| Solvesso 150 | 304.0 |

The reaction was carried out in a reactor equipped with a stirrer, condenser, thermometer, heater, and inert gas blanket tube.

Solution No. 2 was charged to the reactor and heated to 120° C. with a slight exotherm observed. Inert gas was on during the heating. Solution No. 1 was added thereto over a period of about 2 hours. Once the addition of Solution No. 1 was complete, the dropwise addition of Solution No. 3 was begun over a period of 3 hours. After the addition of Solution No. 3 was complete, the reactor was held at reflux temperature (118° to 120° C.) for about 1 hour. The reaction mixture was then cooled and Solution No. 4 was added thereto. The modified acrylic resin had an acid value of 7.6, a percent solids of 50.4 and a Gardner-Holdt viscosity of T-U.

A coating formulation was prepared using the resin thus produced, without the necessity of an external curing agent. the film produced had excellent properties.

EXAMPLE IV

The following were charged to a reactor:

| | Parts by Weight |
|---|---|
| Isophorone diisocyanate | 888 |
| Polycaprolactone diol (reaction product of caprolactone and diethylene glycol; molecular weight = 530) | 1060 |
| Cellosolve acetate | 649 |

The mixture was held at about 25° C. for about 6 hours. Using the isocyanate-terminated prepolymer thus produced, the following were charged to a reactor:

| | Parts by Weight |
|---|---|
| Prepolymer | 2031.0 |
| Hydroxyethylacrylate | 346.0 |
| Cellosolve acetate | 115.0 |

The resultant mixture was held at 200° F. for about 3 hours. Using the resultant product, the following were charged to a reactor:

| | Parts by Weight |
|---|---|
| Reaction product (above) | 259.0 |
| Hydroxyethylacrylate | 312.0 |
| Methacrylonitrile | 424.0 |
| Styrene | 546.0 |
| Butylacrylate | 469.0 |
| Xylene | 385.0 |
| T-dodecylmercaptan | 67.5 |

This mixture was heated at about 120° C. for 1 hour, after which were added 534 parts of xylene, 567 parts of toluene and 30 parts of azobisisobutyronitrile. The mixture was heated at about 130° C. for about 2 hours, and was then thinned with 300 parts of toluene. Heating at about 125° C. was continued for about 4 more hours, with the mixture then being thinned with 197 parts of toluene and then being cooled. The resultant resin had an acid number of about 1.08, a hydroxyl value of about 41.0, a percent solids of about 50, and a Gardner-Holdt viscosity of Z2-Z3.

A coating formulation was then made by blending the following:

| | Parts by Weight |
|---|---|
| Modified acrylic | 15.0 |
| Hexamethoxymethylmelamine | 3.7 |

The resultant mixture was drawn down on an aluminum sheet and was baked at 500° F. for 90 seconds. The resultant film had a pencil hardness of H and a Gardner Impact of 10 inch pounds.

According to the provisions of the Patent Statutes, there are described above the invention and what are now considered to be its best embodiments. However, within the scope of the appended claims, it is to be understood that the invention can be practiced otherwise than as specifically described.

I claim:
1. A method of producing a solvent-soluble coating composition which comprises reacting:
   1. from about 1 to 30 percent by weight of a saturated aliphatic or aromatic polyisocyanate;
   2. from about 4 to 50 percent by weight of a hydroxyl-containing material selected from the group consisting of saturated aliphatic or aromatic polymeric diols having glass transition temperatures less than 50° C., saturated aliphatic or aromatic low molecular weight diols and mixtures thereof;
   3. from about 2 to 20 percent by weight of a hydroxyalkyl ester of an ethylenically unsaturated carboxylic acid;
   4. from about 1 to 20 percent by weight of a monomer selected from the group consisting of alkoxymethyl-containing ethylenically unsaturated amides, and ethylenicaly unsaturated blocked isocyanates which are capable of curing said coating composition through hydroxyl functionality of said reaction product and the isocyanate groups of said blocked isocyanates or the N-alkoxymethyl groups of said amide;
   5. from about 25 to 90 percent by weight of an ethylenically unsaturated monomer or mixture of monomers diffirent from (3) and (4); the equivalent ratio of isocyanate groups to hydroxyl groups in (1), (2) and (3) being between 1:1.1 and 1:9 so as to obtain an ungelled reaction product and introduce hydroxyl functionality into the reaction product; said coating composition being further characterized as being essentially free of unreacted NCO groups and ethylenic unsaturaton and said coating compositon being curable through reacton of the N-alkoxymethyl groups or the blocked isocyanate groups at times and temperatures sufficient for these groups to react with the hydroxyl functionality of said reaction product, said reaction being conducted by any of the following steps:
   A. reacting the hydroxyalkyl ester with the polyisocyanate and subsequently reacting this product either consecutively or simultaneously with the hydroxyl-containing material and the monomer component (4) and (5);
   B. reacting the hydroxyalkyl ester, the hydroxyl-containing material and the polyisocyanate and subsequently reacting this product with the monomer component (4) and (5);
   C. reacting all the components (1), (2), (3), (4) and (5) together simultaneously;
   D. reacting the polyisocyanate and the hydroxyl-containing material to form an isocyanate-terminated prepolymer and the prepolymer reacted consecutively or simultaneously with the hydroxyalkyl ester and the monomer component (4) and (5).
2. The method of claim 1, wherein said hydroxyalkyl ester is selected from the group consisting of hydroxylakyl acrylates and methacrylates.
3. The method of claim 2, wherein said alkoxymethyl-containing ethylenically unsaturated amide is selected from the group consisting of N-alkoxmethylacrylamides, N-alkoxymethylmethacrylamides, N-alkoxymethyldiacetoneacrylamides, N-(alkoxymethyl)-O-(acryloxyethyl) carbamates and N-methyl-N-alkoxymethacrylamides.
4. The method of claim 1, wherein said saturated aliphatic or aromatic polymeric polyol is a polyether polyol.
5. The method of claim 4, wherein said polyether polyol is a poly(alkylene)polyol.
6. The method of claim 4, wherein said polymeric polyol is a polyester polyol.
7. The metod of claim 6, wherein said polyester polyol is the reaction product of adipic acid and neopentyl glycol.
8. The method of claim 6, wherein said polyester polyol is the reaction product of caprolactone and a polyol.
9. A method of producing a solvent-soluble coating compositon which comprises:
   A. reacting:
      1. from about 1 to 30 percent by weight of a saturated aliphatic or aromatic polyisocyanate;
      2. from about 4 to 50 percent by weight of a hydroxyl-containing material selected from the group consisting of saturated aliphatic or aromatic polymeric diols having glass transistion temperatures less than 50° C., saturated aliphatic or aromatic low molecular weight diols and mixtures thereof;
3. from about 2 to 20 percent by weight of a hydroxylakyl ester of an ethylenically unsaturated carboxylic acid;
4. from about 25 to 90 percent by weight of at least one ethylenically unsaturated monomer different from (3); the equivalent ratio of isocyanate to hydroxyl groups in (1), (2) and (3) being between 1:1.1 and 1:9 so as to obtan an ungelled reacton product and introduce hydroxyl functionality into said reaction product;

said reaction product being further characterized as being essentially free of unreacted NCO groups and ethylenic unsaturation; the reaction being conducted by any of the following steps:
 a. reacting the hydroxylakyl ester with the polyisocyanate and subsequently reacting this product either consecutively or simultaneously with a hydroxyl-containing material and the monommer component (4);
 b. reacting the hydroxyalkyl ester, the hydroxyl-containing material and the polyisocyanate and subsequently reacting this product with the monomer component (4);
 c. simultaneously reacting all four components;
 d. reacting the polyisocyanate and the hydroxyl-containing material to form an isocyanate-terminated prepolymer and reacting this prepolymer either consecutively or simultaneously with the hydroxyalkyl ester and the monomer component (4);

b. adding a curing agent selected from the group consisting of aminoplast resins, phenolic resins, and polyisocyanates which are different from the reaction product of (A) which cure said ungelled reaction product through condensation reacton with the hydroxyl functionality in said ungelled reaction product.

10. The method of claim 9, wherein said hydroxyethyl ester is selected from the group consisting of hydroxyalkyl acrylates and methacrylates.

11. The method of claim 9, wherein said polymeric polyol is a polyether polyol.

12. The method of claim 9, wherin said polymeric polyol is a polyester polyol.

13. The method of claim 9 in which (4) contains at least in part an alkoxymethyl-containing ethylenically unsaturated amide.

* * * * *